Sept. 15, 1953 E. D. WILKIN 2,651,804
MOWER HANDLE
Filed Aug. 26, 1950 2 Sheets-Sheet 1
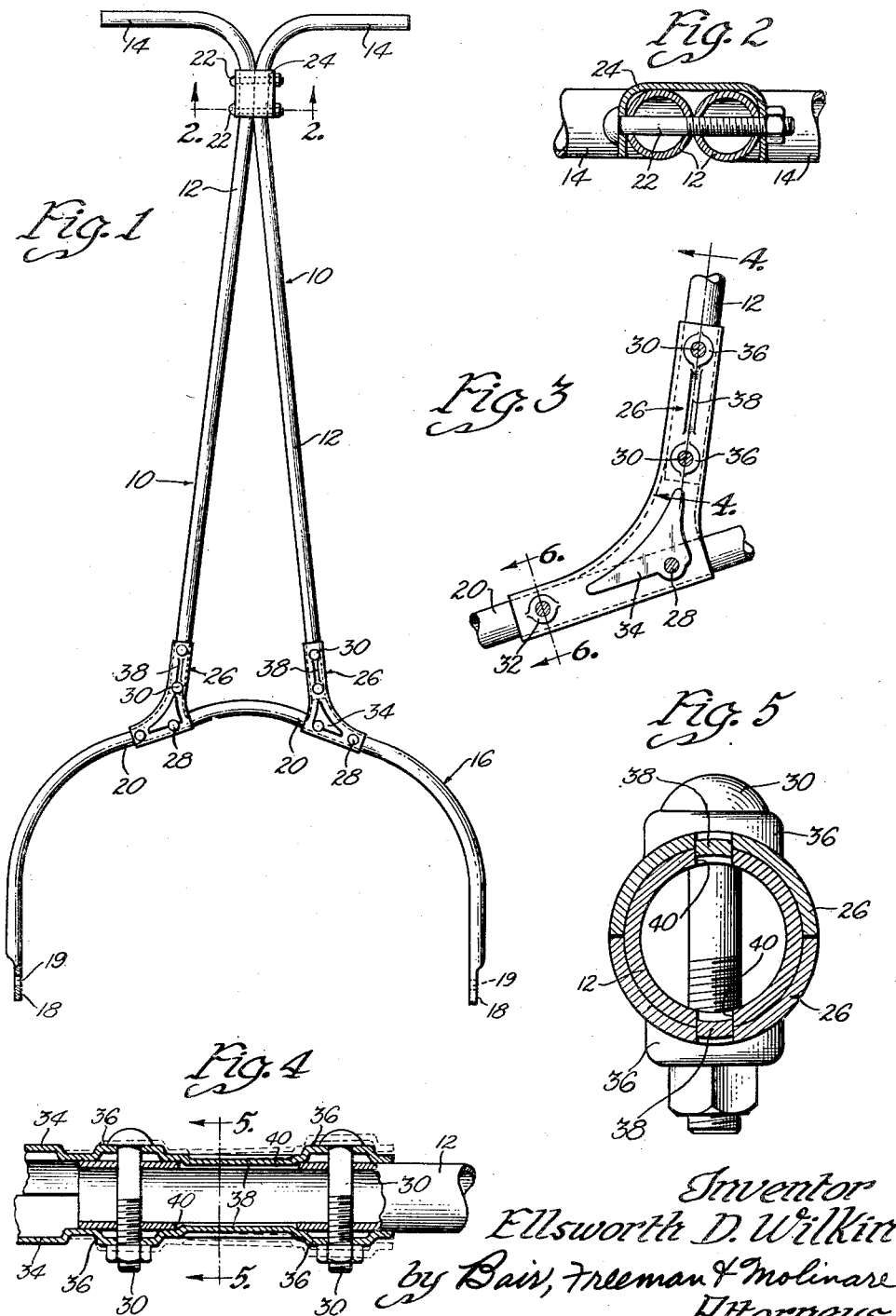
Inventor
Ellsworth D. Wilkin
by Bair, Freeman & Molinare
Attorneys

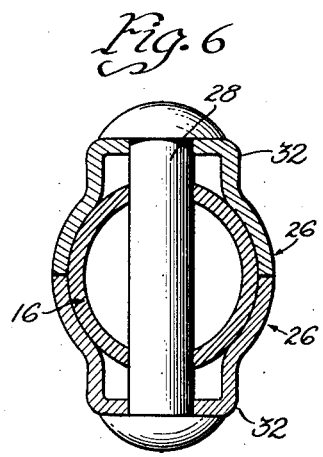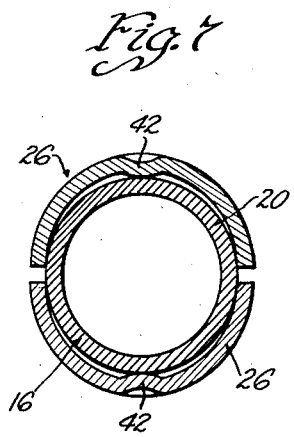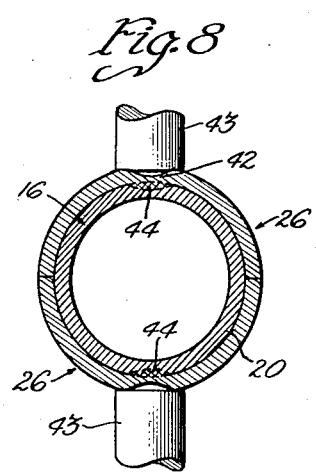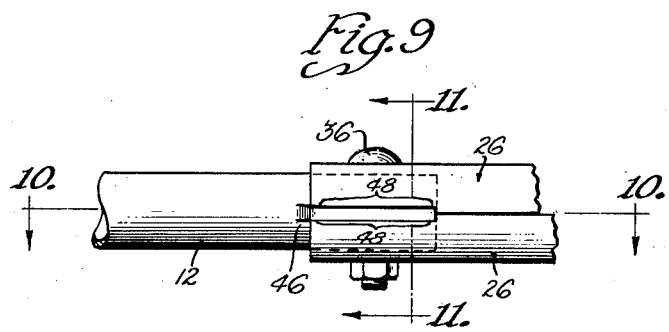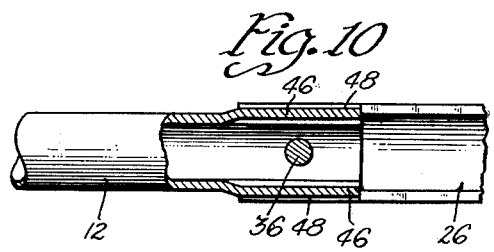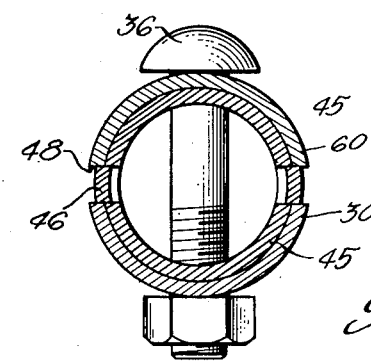

Patented Sept. 15, 1953

2,651,804

UNITED STATES PATENT OFFICE 2,651,804

MOWER HANDLE

Ellsworth D. Wilkin, Ottumwa, Iowa, assignor to Johnston Lawn Mower Corporation, Ottumwa, Iowa, a corporation of Iowa Application August 26, 1950, Serial No. 181,660

1 Claim. (Cl. 16—111)

This invention relates to a handle construction for power lawn mowers and the like and contemplates a knock-down type of mower handle to provide one which can be shipped in parts to reduce the size of the package for containing it when compared with a completely assembled handle.

One object of the invention is to provide a handle structure in which handle members and a yoke for connection of the handle members to the mower are separable, provision being made for connecting the two together in an efficient manner.

Heretofore, the usual practice has been to break down the handle of a mower or similar implement into three parts, a yoke, a handle-shank and a handle cross bar. Another object of my invention is to provide a handle structure in which, instead of the usual arrangement, a pair of handle members are provided, each of which includes a handle-shank and one handle portion, the two handle members being assembled together to provide a complete shank and handle structure in which the shank is formed of two parts that diverge forwardly and downwardly from the handle portion, their diverging ends being connected by means of handle-to-yoke connectors, and a simple means of connection at this point being provided.

Still another object is to provide such means of connection with a torsion resistant keying arrangement to eliminate twisting of the handle members relative to the yoke, the connectors being attached to spaced portions of the yoke which portions are at an angle to each other to further rigidify the complete assembly of handle and yoke.

Still a further object is to provide a handle structure in which the handle-shanks may be easily and quickly connected by the purchaser with the handle-to-yoke connectors and the two handle members may be readily connected together adjacent the handle portions thereof by means of bolts, the resulting completed assembly being substantially as rigid as though the parts were welded or otherwise rigidly connected together.

An additional object is to provide a handle-to-yoke connector arrangement which is adaptable for different methods of attachment to the yoke and to the handle members.

With these and other objects in view, my invention consists in the construction, arrangement and combination of the various parts of my mower handle, whereby the objects contemplated are attained, as hereinafter more fully set forth, pointed out in my claim and illustrated in the accompanying drawings, wherein:

Figure 1 is a plan view of a mower handle embodying my present invention.

Figure 2 is an enlarged sectional view on the line 2—2 of Figure 1.

Figure 3 is an enlarged plan view of a portion of Figure 1 with the heads of the bolts cut off and the bolts shown in section.

Figure 4 is an enlarged sectional view on the line 4—4 of Figure 3 showing a handle-to-yoke connector and a handle-shank connected thereto.

Figure 5 is an enlarged sectional view on the line 5—5 of Figure 4.

Figure 6 is an enlarged sectional view on the line 6—6 of Figure 3 showing the handle-to-yoke connector and a yoke connected thereto.

Figure 7 is a similar sectional view showing a modification in which the parts are in position for being projection spot-welded together instead of riveted together as in Figure 6.

Figure 8 is an enlarged sectional view of Figure 7 after the welding operation has been completed and illustrates the position of the electrodes for accomplishing the weld.

Figure 9 is a side elevation similar to Figure 4 but showing a modified handle-shank and a modified handle-to-yoke connector.

Figure 10 is a sectional view on the line 10—10 of Figure 9; and

Figure 11 is an enlarged sectional view on the line 11—11 of Figure 9.

On the accompanying drawings I have used the reference numeral 10 to indicate a handle member. The handle member 10 has a shank portion 12 and a handle portion 14. Two of the handle members 10 are provided as illustrated in Figure 1 and are assembled in conjunction with a yoke 16 to form a completed mower handle structure.

The yoke 16 has a pair of ears 18 perforated as at 19 for pivotal connection to the mower frame and a pair of angular portions 20 forming the cross piece of the yoke. I refer to the portions 20 as "angular" portions because as noted in Figure 1, they are at an obtuse angle to each other instead of being aligned as in a simple shape of yoke. The purpose of the angular arrangement will hereinafter appear.

The handle members 10 are bolted together by a pair of clamp bolts 22 adjacent the handle portions 14. I preferably provide at this point a clamp plate 24 which is channel-shaped in cross section as shown in Figure 2 to give the handle a more finished appearance, to contribute to the rigidity of the connection, and to provide flanges which form suitable shoulders for the heads and nuts of the clamp bolts 22. For connecting the lower ends of the handle shanks 12 to the yokes 16, I provide handle-to-yoke connectors 26 which, as shown in Figure 5, are in pairs, that is, one connector above each shank and one connector below it making a total of four connectors 26 in the total handle assembly.

The connectors 26 are advantageously formed of sheet metal in suitable press dies to provide half cylindrical shapes to receive both the shanks 12 and the yoke 16 as shown in Figures 5 and 6 respectively. The connectors 26 may be permanently secured to the yoke 16 by rivets 28 as shown in Figure 6, or bolts may be used in place of the rivets in the event that it is desirable to ship the mower with the connectors 26 disconnected from the yoke 16.

Bolts 30 are provided for connecting the connectors 26 with the handle-shanks 12 as shown in Figure 5. The connectors are preferably formed with bosses 32 and 34 for the rivets 28 (or bolts if used at this point) and with bosses 36 for the bolts 30. These bosses provide parallel spaced shoulders for the bolt heads and the riveted head of the rivets 28 and for the heads and nuts of the bolts 30.

Referring to Figures 4 and 5, I provide a torsion resisting keying arrangement comprising keys 38 formed in the connectors 26 between the bosses 36 by shearing the sides of the keys from the sheet metal of the connectors and depressing the keys slightly less than the thickness of the sheet metal. The handle-shanks 12 are then provided with slots 40 which receive the keys.

During assembly the connectors 26 may be sprung apart as illustrated by dash lines in Figure 4 to permit the keys 38 to pass over the lower ends of the shanks 12 until they register with the slots 40 and drop into them. Thereafter the bolts 30 are inserted and tightened to the solid line position shown in Figure 4.

Instead of riveting the connectors 26 to the yoke 16 as in Figure 6 (or bolting these parts together) they may be welded together by a projection spot-welding method as disclosed in Figures 7 and 8. The connectors 26 in that event are provided with a pair of projections 42 in place of being perforated for the rivets 28 or for bolts. The parts are then assembled as in Figure 7 and electrodes 43 applied to the connectors over the projections 42 as illustrated in Figure 8 whereupon the electrodes are energized, and under pressure and the heat generated by the resistance afforded between the projections and the yoke portions 20, weld the connectors and the yoke together as indicated at 44 in Figure 8. This arrangement makes an inexpensive yet satisfactory and rigid permanent connection between the yoke and the connectors.

Figures 9, 10 and 11 show a modified torsion resistant keying arrangement for the connectors 26 and the handle shanks 12. In this case, keys 46 are sheared inwardly from the lower ends of the shanks and depressed outwardly slightly less than the thickness of the metal. The connectors 26 are then each provided with an L-shaped notch (indicated by brackets 48) so that the two notches of the upper and lower connectors form a complete two-sided notch that coacts with the keys 46 as illustrated particularly in Figures 8, 10 and 11. With this arrangement the parts can be keyed together without having to spread the companion connectors 26 apart as in Figure 4. A clamp bolt 36 is then used for clamping the connectors 26 against the shank 12 and the notches 48 against the sides of the key 46.

The knock-down types of handles for lawn mowers with which I am familiar are torsionally weak—that is, the strains imposed on the handle portion thereof permits it to be twisted out of the plane of the yoke. Connectors are usually provided between the handle cross bar and the handle-shank and between the handle-shank and the yoke. One (and usually both) of these connectors are weak points of the handle.

I have overcome this weakness in prior devices by making the shank portions 12 and the handle portions 14 integral with each other, and then providing a connecting arrangement at 22—24 for connecting the two parts together instead of connecting a cross bar of a handle to the upper end of a shank. Further I have provided a pair of the shank portions 12 and have arranged them to diverge at an acute angle which features coupled with well designed connectors 26 torsionally keyed to the shank portions 12 and connected to angular portions 20 of the yoke 16 result in a structure having rigidity equal to a so-called "one-piece" handle structure such as one that is formed up of two or more pieces welded together.

Torsion at the clamp plate 24 is minimized by the type of connection provided which requires that both the clamp plate 24 and the bolts 22 would have to bend to permit torsion. Torsion between the shank portions 12 and the connectors 26 is resisted both by the bolts 30 and the keying arrangement 38—40 in Figures 3, 4 and 5 or 46—48 in Figures 9, 10 and 11.

Finally torsion is resisted between the connectors 26 and the yoke 16 due to the angular arrangement of the portions 20. Any tendency to torsion must create a bending of the yoke as distinguished from a tendency to shear the rivets 28 or bolts if used in a design of yoke having the portions 20 aligned with each other. All of the features just referred to are important in the provision of a knock-down handle of the character disclosed wherein the design is such that there is great resistance to any tendency for moving any one element of the total structure out of a plane in which the yoke and the handle members are originally assembled. It is believed obvious that the constructional features brought out accomplish the contemplated objects and result in an efficient knock-down handle structure which, when assembled, is very rigid and entirely satisfactory as a heavy-duty handle for power lawn mowers as well as manually operable mowers.

Some changes may be made in the construction and arrangement of the parts of my mower handle without departing from the real spirit and purpose of my invention, and it is my intention to cover by my claim any modified forms of structure or use of mechanical equivalents which may be reasonably included within their scope.

I claim as my invention:

In a handle-to-mower connection of the character disclosed, a yoke having a pair of angular portions, and means for connecting diverged ends of handle members to said angular portions of said yoke, comprising handle-to-yoke connectors having arms at obtuse angles to each other, one arm of each connector being secured to said angular portions of said yoke and the other arm thereof being detachably secured to said handle members, said last arms having key and slot connections with said handle members to resist torsional movement of the handle members relative to said connectors.

ELLSWORTH D. WILKIN.

References Cited in the file of this patent

UNITED STATES PATENTS

| Number | Name | Date |
|---|---|---|
| 195,336 | Braun | Sept. 18, 1877 |
| 688,189 | Mason | Dec. 3, 1901 |
| 1,896,442 | Farmer | Feb. 7, 1933 |
| 2,305,138 | Clemson | Dec. 15, 1942 |
| 2,478,512 | Taylor | Aug. 9, 1949 |